(12) United States Patent
LaBarge et al.

(10) Patent No.: US 7,767,163 B2
(45) Date of Patent: Aug. 3, 2010

(54) EXHAUST TREATMENT DEVICES

(75) Inventors: William J. LaBarge, Bay City, MI (US); Kenneth Price, Brighton, MI (US); Joseph V. Bonadies, Clarkston, MI (US); Joachim Kupe, Davisburg, MI (US)

(73) Assignee: Umicore AG & Co. KG, Hanau (DE)

( * ) Notice: Subject to any disclaimer, the term of this patent is extended or adjusted under 35 U.S.C. 154(b) by 1171 days.

(21) Appl. No.: 10/827,826

(22) Filed: Apr. 20, 2004

(65) Prior Publication Data

US 2005/0232826 A1  Oct. 20, 2005

(51) Int. Cl.
*B01D 50/00* (2006.01)
*B01D 53/34* (2006.01)
*F01N 3/00* (2006.01)
*F23J 11/00* (2006.01)
*B01J 23/00* (2006.01)

(52) U.S. Cl. .............. 422/171; 422/168; 422/169; 422/170; 502/349; 502/353

(58) Field of Classification Search .............. 422/168, 422/171, 169, 170; 502/349, 353
See application file for complete search history.

(56) References Cited

U.S. PATENT DOCUMENTS

| | | | |
|---|---|---|---|
| 2,898,202 A | 8/1959 | Houdry et al. | |
| 3,370,914 A | 2/1968 | Gross et al. | |
| 4,576,617 A | 3/1986 | Renevot | 55/96 |
| 5,272,871 A | 12/1993 | Oshima et al. | 60/274 |
| 5,322,671 A | 6/1994 | Shustorovich et al. | 422/176 |
| 5,406,790 A | 4/1995 | Hirota et al. | 60/276 |
| 5,412,946 A | 5/1995 | Oshima et al. | 60/286 |
| 5,437,153 A | 8/1995 | Takeshima et al. | 60/276 |
| 5,472,673 A | 12/1995 | Goto et al. | 422/169 |
| 5,473,890 A | 12/1995 | Takeshima et al. | 60/285 |
| 5,490,977 A * | 2/1996 | Wan et al. | 423/210 |
| 5,543,124 A | 8/1996 | Yokota et al. | 423/239.1 |
| 5,551,231 A | 9/1996 | Tanaka et al. | 60/289 |
| 5,586,433 A | 12/1996 | Boegner et al. | 60/274 |
| 5,606,856 A | 3/1997 | Linder et al. | 60/286 |
| 5,657,625 A | 8/1997 | Koga et al. | 60/274 |
| 5,711,149 A | 1/1998 | Araki et al. | 60/278 |

(Continued)

FOREIGN PATENT DOCUMENTS

DE  19543219 C1  12/1996

(Continued)

OTHER PUBLICATIONS

JPO Machine Translation of JP-2003-095644 A Mar. 11, 2008.*

(Continued)

*Primary Examiner*—Alexa D Neckel
*Assistant Examiner*—Matthew J Merkling
(74) *Attorney, Agent, or Firm*—Smith Gambrell & Russell LLP (57) ABSTRACT

An exhaust emission control system can include a reformer a fuel source disposed upstream of and in fluid communication with the reformer, and a $NO_x$ adsorber disposed downstream of and in fluid communication with the reformer. The NOx adsorber can include a NOx adsorber catalyst having an acid adsorber disposed on the substrate and a base adsorber disposed over the acid adsorber.

5 Claims, 1 Drawing Sheet

U.S. PATENT DOCUMENTS

| | | | |
|---|---|---|---|
| 5,727,385 A | 3/1998 | Hepburn | 60/297 |
| 5,746,989 A | 5/1998 | Murachi et al. | 423/212 R |
| 5,768,888 A | 6/1998 | Matros et al. | 60/274 |
| 5,827,489 A * | 10/1998 | Garcin et al. | 423/239.1 |
| 5,850,735 A | 12/1998 | Araki et al. | 60/274 |
| 5,853,684 A | 12/1998 | Fang et al. | 423/244.1 |
| 5,894,725 A | 4/1999 | Cullen et al. | 60/274 |
| 5,921,076 A | 7/1999 | Krutzsch et al. | 60/274 |
| 6,077,493 A * | 6/2000 | Ueda et al. | 423/239.1 |
| 6,122,909 A | 9/2000 | Murphy et al. | 60/286 |
| 6,125,629 A | 10/2000 | Patchett | 60/286 |
| 6,170,259 B1 | 1/2001 | Boegner et al. | 60/286 |
| 6,176,078 B1 | 1/2001 | Balko et al. | 60/274 |
| 6,199,374 B1 | 3/2001 | Hirota et al. | 60/277 |
| 6,199,375 B1 | 3/2001 | Russell | 60/286 |
| 6,237,326 B1 | 5/2001 | Russell | 60/274 |
| 6,247,303 B1 | 6/2001 | Broer et al. | 60/274 |
| 6,253,543 B1 | 7/2001 | Russell | 60/274 |
| 6,254,842 B1 * | 7/2001 | Hu et al. | 423/213.5 |
| 6,260,353 B1 | 7/2001 | Takahashi | 60/286 |
| 6,269,633 B1 | 8/2001 | van Nieuwstadt et al. | 60/277 |
| 6,272,848 B1 | 8/2001 | Okude et al. | 60/274 |
| 6,293,094 B1 | 9/2001 | Schmidt et al. | 60/284 |
| 6,293,096 B1 | 9/2001 | Khair et al. | 60/286 |
| 6,301,882 B1 | 10/2001 | Manaka | 60/285 |
| 6,324,834 B1 | 12/2001 | Schnaibel et al. | 60/274 |
| 6,345,496 B1 * | 2/2002 | Fuwa et al. | 60/274 |
| 6,354,078 B1 | 3/2002 | Karlsson et al. | 60/274 |
| 6,502,391 B1 | 1/2003 | Hirota et al. | 60/288 |
| 6,560,958 B1 | 5/2003 | Bromberg et al. | 60/275 |
| 2001/0004832 A1 | 6/2001 | Hanaki et al. | 60/286 |
| 2001/0039798 A1 | 11/2001 | Pott | 60/278 |
| 2001/0041153 A1 | 11/2001 | Benz | 422/169 |
| 2002/0141908 A1 * | 10/2002 | Miyoshi et al. | 422/168 |
| 2002/0195173 A1 * | 12/2002 | Bortun et al. | 148/407 |
| 2003/0101713 A1 | 6/2003 | Dalla Betta et al. | 60/284 |
| 2004/0076565 A1 * | 4/2004 | Gandhi et al. | 423/235 |

FOREIGN PATENT DOCUMENTS

| | | |
|---|---|---|
| JP | 06117224 A | 4/1994 |
| JP | 06336914 | 12/1994 |
| JP | 2003095644 A * | 4/2003 |
| WO | WO 01/14698 A1 | 3/2001 |

OTHER PUBLICATIONS

Japanese Patent No.: JP406117224A; Publication Date: Apr. 26, 1994; Abstract Only (1 page).

* cited by examiner

EXHAUST TREATMENT DEVICES

BACKGROUND OF THE DISCLOSURE

This disclosure relates to a $NO_x$ adsorber catalyst for reduction of the amount undesirable emission components emitted in exhaust gases, an exhaust emission control system, and to methods of making thereof.

In order to meet exhaust gas emission standards, the exhaust emitted from internal combustion engines is treated prior to emission into the atmosphere. Typically, exhaust gases are routed through an exhaust emission control device disposed in fluid communication with the exhaust outlet system of the engine, where the gases are treated by reactions with a catalyst composition deposited on a porous support material. The exhaust gases generally contain undesirable emission components including carbon monoxide (CO), hydrocarbons (HC), and nitrogen oxides ($NO_x$). As a means of simultaneously removing the objectionable CO, HC, and $NO_x$ components, various "three-way" catalyst compositions have been developed. When operating under lean-burn conditions (i.e., where the air-to-fuel ratio is adjusted to be somewhat greater than the stoichiometric ratio), however, typical three-way catalyst systems are relatively efficient in oxidizing unburned HC and CO, but can be inefficient in reducing $NO_x$ emission components.

To treat nitrogen oxides in the exhaust gases of engines operating under lean-burn conditions, $NO_x$ adsorbers can be added in exhaust lines along with three-way catalysts. A $NO_x$ adsorber typically contains a precious metal component that converts $NO_x$ species to nitrogen dioxide ($NO_2$). Nitrogen dioxide in the presence of water ($H_2O$) forms in situ nitrous acid ($HNO_3$), a very strong acid. A conventional $NO_x$ adsorber formulation is an acid adsorber containing an alkaline oxide such as barium oxide (BaO). Barium oxide in the presence of water forms in situ barium hydroxide $Ba(OH)_2$, a very strong base. The strong base adsorbs acids such as $NO_x$ and $SO_x$ sulfur oxide) that then reacts with hydrocarbons in the exhaust, especially double bonded species such as propylene, forming gaseous products (e.g., $N_2$ (diatomic nitrogen or nitrogen gas), $CO_2$ (carbon dioxide), $H_2O$ (water) and $SO_2$ (sulfur dioxide)). A conventional $NO_x$ adsorber (e.g., one containing just an acid adsorber component), however, is usually sufficient only in an oxidizing atmosphere. In a reducing atmosphere (e.g., one containing hydrogen), ammonia is formed rather than the desired $N_2$. The ammonia can react with water, forming ammonium hydroxide ($NH_4OH$), a very strong base. Because of their low affinity for the acid adsorbing support, the ammonia and ammonium hydroxide can desorb from the acid adsorber before the conversion to $N_2$ can be accomplished. Emission of ammonia and ammonium hydroxide to the atmosphere is not desirable.

There remains a need for fuel reformers and $NO_x$ adsorbers, particularly those that are effective in hydrogen containing atmospheres.

SUMMARY OF THE DISCLOSURE

Disclosed herein are treatment devices, exhaust emission control systems, and methods for use of the devices and systems. In one embodiment, a treatment device comprises: a treatment element comprising substrate and a catalyst, and a housing disposed around the substrate. The catalyst comprises an acid adsorber disposed on the substrate and a base adsorber disposed over the acid adsorber. The acid adsorber is capable of adsorbing NOx and converting NOx to NHx when contacted with $H_2$. The base adsorber is capable of adsorbing NHx and converting NHx and NOx to $N_2$.

In one embodiment, the exhaust emission control system comprises: a reformer, a fuel source disposed upstream of and in fluid communication with the reformer; and a $NO_x$ adsorber disposed downstream of and in fluid communication with the reformer. The NOx adsorber comprises a NOx adsorber catalyst comprising an acid adsorber disposed on the substrate and a base adsorber disposed over the acid adsorber. The acid adsorber is capable of adsorbing NOx and converting NOx to NHx when contacted with $H_2$. The base adsorber is capable of adsorbing NHx and converting NHx and NOx to $N_2$.

In another embodiment, the exhaust emission control system comprises: a reformer comprising a reformer catalyst, a fuel source disposed upstream of and in fluid communication with the reformer, a particulate trap disposed downstream of and in fluid communication with the reformer, a $NO_x$ adsorber disposed downstream of and in fluid communication with the particulate trap, and an oxidation treatment element disposed downstream of and in fluid communication with the NOx adsorber. The reformer catalyst comprises a reformer zirconium component in solid solution with a transition metal oxide component; and a reformer precious metal component. The NOx adsorber comprises a NOx adsorber catalyst comprising an acid adsorber disposed on the substrate and a base adsorber disposed over the acid adsorber. The acid adsorber comprises an acid adsorber zirconium component in solid solution with at least one of an alkali element component and an alkaline earth metal component, and comprises an acid adsorber precious metal component, and the base adsorber comprises a base adsorber zirconium component in solid solution with an transition metal oxide component, and comprises a base adsorber precious metal component. The oxidation treatment element comprises an oxidation catalyst comprising an oxidation zirconium component in solid solution with a cationic element selected from the group consisting of trivalent cationic element and tetravalent cationic elements, and combinations comprising at least one of these cationic elements; and an oxidation precious metal component.

In one embodiment, the method of operating a $NO_x$ adsorber comprises: exposing the $NO_x$ adsorber to a stream comprising NOx; adsorbing NOx in an acid adsorber underlayer; forming NHx; adsorbing the NHx in a base adsorber overlayer; and reacting the NHx with additional NOx to form $N_2$.

The above described and other features are exemplified by the following figures and detailed description.

DETAILED DESCRIPTION

Figure 2:
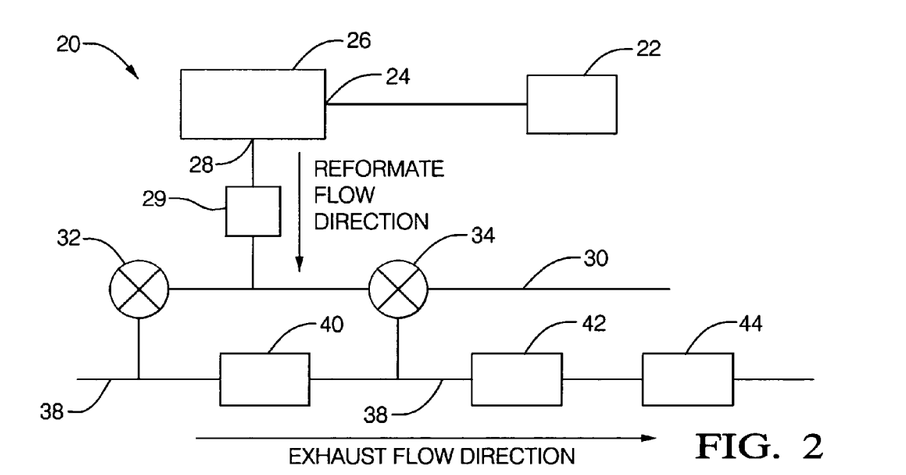
FIG. 2 is a schematic of an exemplary embodiment of an exhaust emission control device.

It is noted that the terms "first," "second," and the like, herein do not denote any amount, order, or importance, but rather are used to distinguish one element from another. The terms "a" and "an" herein do not denote a limitation of quantity, but rather denote the presence of at least one of the referenced item. Additionally, all ranges disclosed herein are inclusive and combinable (e.g., the ranges of "up to about 25 wt %, with about 5 wt % to about 20 wt % desired," are inclusive of the endpoints and all intermediate values of the ranges of "about 5 wt % to about 25 wt %," etc.). The systems discussed herein may use "on-board" production of reformate (e.g., hydrogen and carbon monoxide), wherein this reformate may be produced "in-line" or "off-line". The term "line" refers to an exhaust fluid stream. As such, "in-line" refers to production of the reformate within the exhaust fluid stream (FIG. 3), whereas "off-line" production refers to the production of the reformate outside of an exhaust fluid stream (FIG. 2). The component produced "off-line" may then be introduced into the exhaust fluid stream.

Strategies for NOx reductant delivery include in-cylinder injection of diesel fuel (post injection), in pipe injection of diesel fuel (fuel secondary injection), or in pipe injection of fuel derivatives. Experiments have been conducted using all three methods, indicating $H_2/CO$ to be the most effective reductant for NOx trap regeneration. To avoid the need to carry additional chemicals on a vehicle, the most practical alternative to supplying $H_2/CO$ is reforming the fuel itself or some derivative thereof.

In automotive exhaust gas it is not possible to fully regenerate adsorbed NOx and SOx from a NOx adsorber unless hydrogen is involved. For hydrogen to be generated and used effectively, the preferred adsorber is primarily zirconium oxide based. The zirconium oxide support contains modifying elements as solid solution or complex oxides with the zirconium. The modifying elements may make the zirconium solid solutions weak acids, weak bases, strong acids or strong bases. Solid solutions have been found to have significantly increased surface area, delayed crystallization, stabilized phases and retarded crystallite growth. The modifying oxide-zirconium oxide solid solutions are more tolerant to water and $SO_2$ poisoning than modifying oxides by themselves, and exhibit higher reversibility after removal of $SO_2$.

Exhaust emission control devices may comprise catalytic converters, evaporative emissions devices, scrubbing devices (e.g., those designed to remove hydrocarbon, sulfur, and the like), particulate filters/traps, adsorbers/absorbers, and the like, as well as combinations comprising one or more of the foregoing devices. A typical exhaust emission control device includes an outer metallic housing or shell, a treatment element (e.g., a substrate with a catalyst thereon and/or therethrough), and a retention material disposed therebetween. The treatment element converts and/or eliminates one or more emission components from an exhaust gas. Multiple exhaust emission control devices can be placed in fluid communication with an exhaust stream to form an exhaust emission control system. The exhaust emission control system of the present disclosure comprises at least two exhaust emission control devices, namely a $NO_x$ adsorber and a fuel reformer.

The $NO_x$ adsorber comprises an acid adsorber underlayer and a base adsorber overlayer, where the $NO_x$ and $SO_x$ in the exhaust stream can be adsorbed on the acid adsorber, and $NH_x$ and $SH_x$ can be adsorbed on the base adsorber. Downstream from the $NO_x$ adsorber, in diesel applications, and optionally in gasoline applications, can be a low temperature oxidation catalyst for the removal of residual oxidation species such as, for example, carbon monoxide, ammonia, and hydrogen sulfide.

The reformer comprises a reformer treatment element that is adapted to generate a hydrogen and carbon monoxide containing fluid from a fuel supplied by a fuel source. The reformer is in fluid communication with an exhaust conduit in fluid communication with an exhaust fluid from an engine. The reformer can comprise an air pump and valve means for selectively controlling and directing the hydrogen and carbon monoxide and/or air containing fluid from the reformer to the exhaust conduit.

The reformer generates a hydrogen-rich gas from a fuel source. The hydrogen rich gas includes, for example, hydrogen, carbon monoxide, carbon dioxide, one carbon species, two carbon species, three carbon species, water, and combinations comprising one or more of the foregoing species. The reformer may be configured for partial oxidation, steam reforming, or dry reforming.

Partial oxidation reformers are based on sub-stoichiometric combustion to achieve the temperatures necessary to reform hydrocarbon fuel. Decomposition of fuel to primarily hydrogen and carbon monoxide occurs through thermal reactions at temperatures of about 400° C. to about 1,200° C. The partial oxidation reactions are exothermic and fuel consumption is not needed to supply the thermal energy. The use of a reformer catalyst can result in acceleration of the reforming reactions and can provide this effect at lower reaction temperatures than those that would otherwise be required in the absence of a catalyst. An example of the partial oxidation reforming reaction is as follows:

$$CH_4+0.5O_2 \rightarrow CO+2H_2$$

$$CxHy+0.5O_2 \rightarrow xCO+0.5yH_2$$

In contrast, steam configured reformers react fuel and steam ($H_2O$) in heated tubes filled with catalysts to convert hydrocarbons into primarily hydrogen and carbon monoxide. An example of the steam reforming reaction is as follows:

$$CH_4+H_2O \rightarrow CO+3H_2$$

$$CO+H_2O \rightarrow CO_2+H_2$$

Dry reforming systems form hydrogen and carbon monoxide in the absence of water, for example, by using carbon dioxide. An example of the dry reforming reaction is depicted in the following reaction:

$$CH_4+CO_2 \rightarrow 2CO+2H_2$$

Preferably, the reformer is a partial oxidation reformer capable of partially oxidizing greater than or equal to about 60 mol. % of hydrocarbons, based upon a total moles of hydrocarbons in an exhaust stream entering the reformer. Specifically, a reformer capable of partially oxidizing greater than or equal to about 75 mol. % of the hydrocarbons, and more specifically of partially oxidizing greater than or equal to about 85 mol. % of the hydrocarbons, is preferred.

The $NO_x$ adsorber treatment element (comprising an acid adsorber component and a base adsorber component), reformer catalyst treatment element and oxidation treatment element are described in detail below.

The acid adsorber component of the $NO_x$ adsorber treatment catalyst comprises a precious metal component and comprises a zirconium component as a solid solution or complex oxide with at least one alkali element or alkaline earth metal component. The alkali element or alkaline earth metal components are only present as solid solutions or complex oxides with the zirconium oxide, for example as $Ba_{0.15}Zr_{0.85}O_2$ solid solution and not as barium oxide supported upon zirconium oxide as for example $BaO/ZrO_2$. The alkali element or alkaline earth metal components can comprise alkali elements, alkaline earth metals, their oxides, alloys and combinations comprising one or more of the foregoing components. Suitable alkali elements and alkaline earth metals include, for example, barium, lithium, calcium, rubidium, potassium, magnesium, sodium, cesium, strontium, and combinations comprising one or more of the foregoing components, with divalent alkali elements preferred over monovalent alkali elements.

The acid adsorber precious metal components are only in association with the zirconium oxide and alkali element or alkaline earth metal components. The precious metal component can comprise a precious metal, oxide, alloy or combination comprising one or more of the foregoing precious metal components. Suitable precious metals include, for example, rhodium, platinum, palladium, ruthenium, iridium and the like, and combinations comprising one or more of the foregoing precious metals. For example platinum supported upon a barium-zirconium solid solution, i.e., the catalyst is $Pt/Ba_{0.15}Zr_{0.85}O_2$; and is not a palladium-barium-zirconium solid solution (i.e., $Pt_{0.02}Ba_{0.15}Zr_{0.83}O2$) and is not palladium oxide and barium oxide supported upon zirconium oxide, i.e. $Pt/BaO/ZrO_2$.

The zirconium component of the acid adsorber component can comprise, for example, less than or equal to about 90 mole percent (mol %) of that layer, based on the total weight of the acid adsorber layer, with about 50 mol. % to about 85 mol. % preferred, and about 60 mol. % to about 80 mol. % more preferred. The remaining mol. % of the acid adsorber layer may comprise trivalent, high surface area, support materials such as aluminum oxides (e.g., gamma-alumina, theta-alumina, delta-alumina), scandium oxides, gallium oxides, aluminates, as well as combinations comprising one or more of the foregoing materials. These materials are added to the zirconium component to enhance the thermal resistance of the catalysts. For example an acid adsorber washcoat comprising about 75 mol. % to about 85 mol. % $Pt/Ba_{0.15}Zr_{0.85}O_2$ solid solution, and about 15 mol. % to about 25 mol % $La_x(Al_2O_3)_{1-x}$ gamma-delta aluminum oxide is preferred.

Also, the zirconium component can comprise, for example, less than or equal to about 98 mol. % zirconium oxide, based on the total mol. % of the zirconium component of the acid adsorbing layer, specifically, about 68 mol. % to about 96 mol. % zirconium oxide can be used, and more specifically about 87 mol. % to about 91 mol. % zirconium oxide, e.g., $Ba_{0.15}Zr_{0.85}O_2$.

The alkali element and/or alkaline earth metal component can be employed at an amount of less than or equal to about 28 mol. %, based on the total moles of the zirconium component portion of the acid adsorber layer, specifically, about 4 mol. % to about 28 mol. % alkali element and/or alkaline earth metal component, more specifically about 8 mol. % to about 22 mol % alkali element or alkaline earth metal component, and even more specifically about 8 mol. % to about 16 mol %, for example $Ba_{0.15}Zr_{0.85}O_2$.

The acid adsorber precious metal component can be employed at an amount of about 0.05 wt % to about 4 wt %, based on the total weight of the acid adsorbing layer, specifically about 0.4 wt % to about 3 wt %, more specifically about 0.75 wt % to about 2 wt %. When the acid adsorber precious metal component can comprises platinum in combination with a second acid adsorber precious metal component, it is preferred that the amount of the second acid adsorber precious metal (based upon the total amount of precious metal in the acid absorber layer), is less than the amount of platinum. The acid adsorber precious metal component can comprise, for example, less than or equal to about 99 mol. % platinum and less than or equal to about 50 mol. % rhodium, based on the total moles of precious metal in the acid adsorber layer. Specifically, the acid adsorber precious metal may comprise about 80 mol. % to about 99 mol. % platinum, more specifically about 90 mol. % to about 99 mol. % platinum. The acid adsorber precious metal may also comprise about 1 mol. % to about 50 mol. % rhodium, specifically about 5 mol. % to about 10 mol. % rhodium. For example an acid adsorber layer can comprise 1.2 wt % post impregnated precious metal loading deposited upon a barium-zirconium solid solution is represented as 1.2 wt % $Pt_{0.93}Rh_{0.07}/Ba_{0.15}Zr_{0.85}O_2$.

The base adsorber layer of the $NO_x$ adsorber treatment catalyst is a zirconium solid solution comprising a zirconium component, a transition metal oxide component, and a precious metal component. Suitable transition metal oxides for forming solid solutions with zirconium oxide include, for example, tungsten oxides, vanadium oxides, niobium oxides, rhenium oxide, molybdenum oxides, nickel oxides, and combinations comprising one or more of the foregoing transition metal oxides, with the variable valence of tungsten and molybdenum preferred. Suitable precious metal components comprise those precious metal components described previously for the acid adsorber layer.

The zirconium component can comprise, for example, less than or equal to about 99.95 mol. % of zirconium oxide based on the total moles of the base adsorber layer. Specifically, about 72 mol. % to about 92 mol. % zirconium oxide can be employed, more specifically, about 76 mol. % to about 86 mol. %. For example the solid solution can comprise $W_xZr_{1-x}O_2$, e.g., $W_{0.03}Zr_{0.97}O_2$ and/or $W_{0.19}Zr_{0.81}O_2$.

The transition metal oxide component can be employed in the solid solution at less than or equal to about 32 mol. %, based on the total moles of the zirconium solid solution in the base adsorber layer. Specifically, about 2 mol. % to about 28 mol. % transition metal oxide, more specifically about 8 mol. % to about 24 mol. %, with about 16 mol. % to about 20 mol. %. For example the solid solution for the base adsorber layer can be a single transition metal oxide in the solid solution (e.g., $W_{0.19}Zr_{0.81}O_2$), or a combination of transition metal oxides in the solid solution (e.g., $Ni_{0.04}Mo_{0.12}Zr_{0.84}$)

In the base adsorber layer, the base adsorber precious metal component can be employed at about 0.05 wt % to about 4 wt %, based on the total weight of the base adsorbing layer. Specifically, about 0.01 wt % to about 6 wt % of the precious metal component can be employed, more specifically about 0.5 wt % to about 4 wt % precious metal component, and even more specifically about 1 wt % to about 2 wt % precious metal component.

Due to the high carbon monoxide (CO) content introduced by the upstream reformer, ruthenium/zirconium catalysts are preferred in the base adsorber layer. When the precious metal component comprises ruthenium in combination with a second precious metal component, it is preferred that the moles of the second precious metal (based upon the total amount of precious metal in the base absorber layer), is less than the amount of ruthenium. The addition of ruthenium depresses activity but improves the durability of the catalyst because of its ability to prevent poisoning. The base adsorber precious metal component can comprise, for example, less than or equal to about 98 mol. % ruthenium and less than or equal to about 70 mol. % platinum, based on the total moles of precious metal in the base adsorber layer. Specifically, about 40 mol. % to about 98 mol. % ruthenium can be present, more specifically, about 50 mol. % to about 93 mol. % ruthenium, and even more specifically, about 60 mol. % to about 90 mol. % ruthenium. The precious metal in the base adsorber layer can comprise about 10 mol. % to about 50 mol. % platinum, specifically, about 20 mol. % to about 40 mol. % platinum. For example, the base absorber layer can be $Ru_{0.70}Pt_{0.30}/W_{0.19}Zr_{0.81}O_2+Al_2O_3$.

The reformer catalyst comprises a reformer zirconium component, a transition metal oxide component, and a reformer precious metal component. Aggregation of the zirconium oxide and/or transition metal is constrained when used as a solid solution component leading to higher precious metal dispersion and surface area. The reformer catalyst may also comprise a rare earth stabilizer. Suitable transition metal oxides for forming zirconium mixed oxides include, for example, nickel oxides, manganese oxides and combinations comprising one or more of the foregoing transition metal oxides. Suitable rare earth oxides for stabilizing transition metal-zirconium mixed oxides include, for example, yttrium oxides, lanthanum oxides, and combinations comprising one or more of the foregoing rare earth oxides. Suitable precious metal components comprise those precious metal components described previously for the acid adsorber layer.

The zirconium oxide component of the reformer catalyst can comprise, for example, less than or equal to about 99 mol. % zirconium oxide, based on the total moles of the reformer washcoat layer, specifically about 62 mol. % to about 98 mol. % zirconium oxide, and more specifically about 72 mol. % to about 94 mol. % zirconium oxide. The balance of the zirconium oxide component may comprise hexaaluminates, hexaaluminogallates, aluminates, and combinations comprising one or more of the foregoing thermally stable high surface area supports. For example a reformer catalyst may comprise of 78 wt. % zirconium solid solution $Y_{0.05}Mn_{0.10}Zr_{0.85}O_2$ and 22 wt. % barium hexaaluminate $BaAl_{12}O_{19}$.

The transition metal oxide component of the reformer catalyst can be employed in amounts of less than or equal to about 28 mol. %, based on the total moles of the zirconium oxide portion of the reformer catalyst. Specifically, about 4 mol. % to about 24 mol. % transition metal oxide can be employed, more specifically, about 6 mol. % to about 20 mol. %, and even more specifically, about 8 mol. % to about 16 mol. %. For example the solid solution $Mn_{1.10}Zr_{0.90}O_2$ can be employed.

The rare earth metal oxide component of the reformer catalyst can be employed at less than or equal to about 20 mol. %, based on the total moles of the zirconium oxide portion of the reformer catalyst. Specifically, about 2 mol. % to about 16 mol. % can be employed, more specifically, about 6 mol. % to about 12 mol. %. For example the solid solution $Y_{0.05}Mn_{0.10}Zr_{0.85}O_2$ can be employed.

The precious metal component of the reformer catalyst can be employed at about 0.01 wt % to about 6 wt %, based on the total weight of the reformer catalyst. Specifically, about 0.5 wt % to about 4 wt % precious metal component can be employed, more specifically, about 1 wt % to about 2 wt %. For example the reformer catalyst can be 2 wt. % PtRh supported upon 98 wt. % solid solution $Y_{0.05}Mn_{0.10}Zr_{0.85}O_2$, i.e., 2 wt. % $PtRh/Y_{0.05}Mn_{0.10}Zr_{0.85}O_2$.

When the precious metal component comprises rhodium in combination with a second precious metal component, it is preferred that the amount of the second precious metal (based upon the total amount of precious metal in the reformer catalyst), is less than the amount of rhodium. The precious metal component can comprise, for example, less than or equal to about 98 mol. % rhodium and less than or equal to about 70 mol. % platinum, based on the total moles of precious metal in the reformer catalyst. Specifically, the reformer catalyst can comprise about 60 mol. % to about 98 mol. % rhodium, more specifically, about 75 mol. % to about 90 mol. % rhodium. Additionally, about 2 mol. % to about 10 mol. % platinum can be employed, specifically about 4 mol. % to about 7 mol. %. For example a reformer catalyst can comprise 2 wt. % precious metals in the atomic ratio $Pt_{0.08}Rh_{0.92}$ supported upon 98 wt. % $Y_{0.05}Mn_{0.10}Zr_{0.85}O_2$, i.e., 2 wt. % $Pt_{0.80}Rh_{0.92}/Y_{0.05}Mn_{0.10}Zr_{0.85}O_2$.

The oxidation catalyst comprises a precious metal component and a zirconium oxide component in solid solution with a cationic element (e.g., trivalent cationic element and/or a tetravalent cationic element). The oxidation catalyst may also comprise a rare earth stabilizer and/or an alkaline earth stabilizer. Suitable trivalent and tetravalent cationic elements for forming zirconium solid solutions include, for example, titanium oxides, aluminum oxides, and combinations comprising one or more of the foregoing metal oxides. Suitable rare earth oxides for forming rare earth-cationic element-zirconium mixed oxides (i.e., rare earth stabilizer-cationic element mixed oxides with a solid solution of cationic element and zirconium oxide component; e.g., wherein greater than or equal to 90 mol. % is solid solution) include, for example, yttrium oxides, lanthanum oxides, and combinations comprising one or more of the foregoing rare earth oxides. Suitable alkaline earth oxides for forming alkaline earth-cationic element-zirconium mixed oxides include, for example, barium oxide, strontium oxide, calcium oxide, magnesium oxide, and combinations comprising one or more of the foregoing rare earth oxides. Suitable precious metal components comprise those precious metal components described previously for the acid adsorber layer.

The zirconium component of the oxidation catalyst can comprise, for example, less than or equal to about 85 mol. % zirconium oxide, based on the total moles of the zirconium oxide component. Specifically, about 50 mol. % to about 90 mol. % zirconium oxide can be employed, and more specifically about 60 mol. % to about 80 mol. % zirconium oxide. The balance of the zirconium component can comprise high surface area support materials such as aluminum oxides (e.g., gamma-alumina, theta-alumina, delta-alumina), scandium oxides, gallium oxides, aluminates, as well as combinations comprising one or more of the foregoing materials. For example an oxidation catalyst can comprise 68 wt. % $BaTi_xZr_{1-x}O_3$ solid solution and 32 wt. % $La_x(Al_2O_3)_{1-x}$ gamma-delta aluminum oxide is preferred.

The cationic element component of the solid solution can be present in an amount of about 15 mol. % to about 85 mol. %, based on the total moles of the solid solution of the oxidation catalyst. Specifically, about 14 mol. % to about 68 mol. % cationic element can be employed, more specifically about 24 mol. % to about 58 mol. % cationic element, and even more specifically about 34 mol. % to about 48 mol. %. For example the solid solution can be $Ti_{0.4}Zr_{0.6}O_3$.

The rare earth oxide and/or alkaline earth metal oxide component of the oxidation zirconium component rare earth and alkaline earth metal oxide component of the oxidation catalyst, can be employed at less than or equal to about 20 mol. %, based on the total moles of the oxidation catalyst. Specifically, about 1 mol. % to about 18 mol. % rare earth and alkaline earth metal oxide component can be employed, more specifically about 2 mol. % to about 14 mol % rare earth and alkaline earth metal oxide component, and even more specifically, about 3 mol. % to about 10 mol. % rare earth and alkaline earth metal oxide component. For example the solid solution $La_{0.03}Ti_{0.37}Y_{0.02}Zr_{0.58}O_2$ or the mixed oxide 0.4 $(La_{0.03}Ti_{0.37})O_2$-0.6$(Y_{0.02}Zr_{0.58})O_2$ can be used.

The precious metal component of the reformer catalyst can be employed at about 0.01 wt % to about 6 wt %, based on the total weight of the reformer catalyst. Specifically, about 0.5 wt % to about 4 wt % precious metal component can be employed, more specifically, about 1 wt % to about 2 wt %. For example, the oxidation catalyst can be 1.2 wt. % PtRh supported upon 98.8 wt. % solid solution $La_{0.03}Ti_{0.37}Y_{0.02}Zr_{0.58}O_2$ i.e. 1.2 wt. % $PtRh/La_{0.02}Ti_{0.37}Y_{0.02}Zr_{0.58}O_2$.

When the precious metal component comprises palladium in combination with a second precious metal component, it is preferred that the amount of the second precious metal (based upon the total amount of precious metal in the oxidation catalyst), is less than the amount of palladium. The precious metal component can comprise, for example, less than or equal to about 98 mol. % palladium and less than or equal to about 70 mol. % platinum, based on the total moles of precious metal in the oxidation catalyst. Specifically, about 60 mol. % to about 98 mol % palladium, and more specifically, about 75 mol. % to about 96 mol. % palladium, can be employed. Additionally, about 2 mol. % to about 8 mol. % platinum, specifically, about 4 mol. % to about 6 mol. % platinum, can be employed, based upon the total weight of the precious metal component. For example a preferred catalyst has 0.8 wt. % precious metals in the atomic ratio $Pt_{0.05}Pd_{0.95}$ supported upon 99.2 wt. % $La_{0.03}Ti_{0.37}Y_{0.02}Zr_{0.58}O_2$ i.e. 0.8 wt. % $Pt_{0.05}Pd_{0.95}/La_{0.03}Ti_{0.37}Y_{0.02}Zr_{0.58}O_2$.

In the formation of the treatment element, slurries (known as washcoats) are wash coated, imbibed, impregnated, physisorbed, chemisorbed, precipitated, or otherwise applied to a substrate. For each of the treatment elements, a washcoat comprising zirconia based solid solutions and high surface area supports can be employed at about 0.5 grams per cubic inch ($g/in^3$) to about 6 $g/in^3$. Specifically, about 1 $g/in^3$ to about 6 $g/in^3$, more specifically, about 2 $g/in^3$ to about 5 $g/in^3$, and even more specifically about 3 $g/in^3$ to about 4 $g/in^3$, can be employed. After application of the slurries, the coated substrates are calcined at about 400° C. to about 600° C. to fix the catalyst compositions on the substrates.

The $NO_x$ adsorber treatment element, comprising the base adsorber layer and the acid adsorber layer, can be formed in a stepwise manner. In this method, the acid adsorber slurry is applied to a first substrate unit or "brick", dried, and calcined to form an acid adsorber underlayer on the substrate. The base adsorber slurry is then applied to over the underlayer, dried, and calcined to form a base adsorber overlayer. In this way, a substrate unit having an underlayer of the acid adsorber and an overlayer of the base adsorber can be formed. This substrate comprising both the acid adsorber and base adsorber is the $NO_x$ adsorber treatment element.

A substrate comprises a material designed for use in a spark ignition or diesel engine environment and having the following characteristics: (1) capable of operating at temperatures up to about 600° C., and up to about 1,000° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., alumina, and the like), glasses, and the like, and combinations comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials can be in the form of foils, preforms, mats, fibrous materials, monoliths (e.g., a honeycomb structure, and the like), other porous structures (e.g., porous glasses, sponges), foams, pellets, particles, molecular sieves, and the like (depending upon the particular device), and combinations comprising one or more of the foregoing materials and forms, e.g., metallic foils, open pore alumina sponges, and porous ultra-low expansion glasses.

The substrate for the oxidation catalyst, reformer catalyst, and NOx adsorber catalyst, can comprise the same or a different substrate material. For example, the substrate can be a cordierite substrate with an extruded honeycomb cell geometry containing greater than or equal to about 600 cells per square inch (cpsi), and a wall thickness of less than or equal to 6 mils (0.15 millimeters (mm)). The substrate can have an extruded honeycomb cell geometry, with the cells being any multi-sided or rounded shape, with substantially square, hexagonal, octagonal or similar geometries preferred due to increased surface area and structural integrity. The substrate is formed into a cell structure with a plurality of cells arranged in a honeycomb pattern using an extrusion process, and the like. Alternatively the reformer substrate has a cell foam structure. The reformer substrate can be formed into a porous cell structure, for example, by depositing ceramic slurry over a fugitive polymer and burnout of the fugitive polymer.

Figure 1:
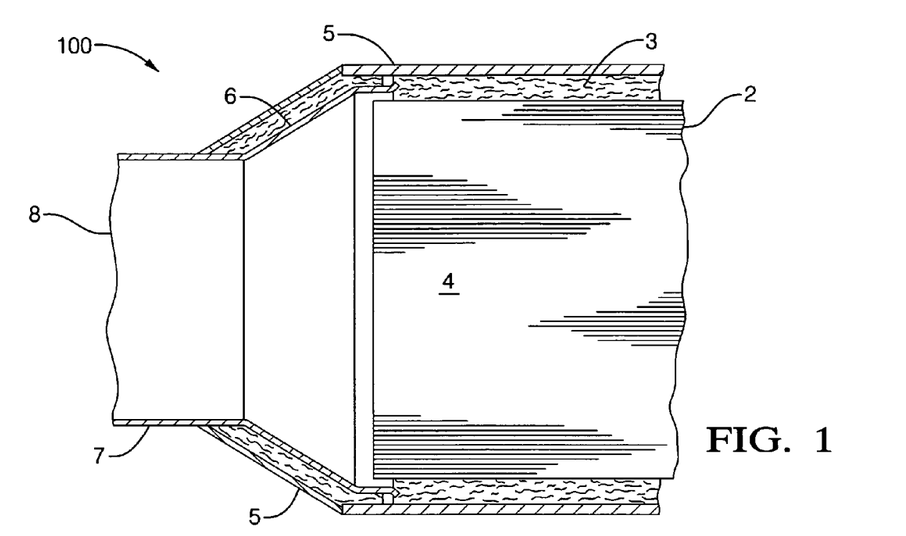
FIG. 1 is a partial cross-sectional view of an exemplary exhaust treatment device.

Referring now to FIG. 1, an exemplary exhaust treatment device, generally designated 100, is illustrated. This exhaust treatment device 100 comprises a treatment element (substrate and catalyst) 2 comprising the catalyst and located within a retention material 3 forming a subassembly 4. A shell 5 is disposed around the subassembly 4. An end-cone 6, comprising a snorkel 7 having an opening 8, is in physical communication with shell 5. Opening 8 allows exhaust fluid communication with treatment element 2.

The retention material 3 insulates the shell from both the high exhaust gas temperatures (e.g., temperatures up to about 1,200° C.) and the exothermic catalytic reaction occurring within the treatment element 2. The retention material 3, which enhances the structural integrity of the treatment element 2 by applying compressive radial forces about it, reducing its axial movement and retaining it in place, is typically concentrically disposed around the treatment element 2 to form a retention element/substrate subassembly 4.

The retention material 3, which can be in the form of a mat, particulates, or the like, can either be an intumescent material (e.g., a material that comprises vermiculite component, i.e., a component that expands upon the application of heat), a non-intumescent material, or a combination thereof. These materials can comprise ceramic materials (e.g., ceramic fibers) and other materials such as organic and inorganic binders and the like, or combinations comprising one or more of the foregoing materials. Non-intumescent materials include materials such as those sold under the trademarks "NEXTEL" and "INTERAM 1101HT" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The subassembly 4 can be concentrically disposed within a shell or housing 5. The choice of material for the shell 5 depends upon the type of exhaust gas, the maximum temperature reached by the treatment element 2, the maximum temperature of the exhaust gas stream, and the like. Suitable materials for the shell include materials capable of resisting under-car salt, temperature, and corrosion. Typically, ferrous materials are employed such as ferritic stainless steels. Ferritic stainless steels can include stainless steels such as, e.g., the 400—Series such as SS-409, SS-439, and SS-441, with grade SS-409 generally preferred.

Also, similar materials as the housing, end cone(s), end plate(s), exhaust manifold cover(s), and the like, can be concentrically fitted about the one or both ends and secured to the housing to provide a gas tight seal. These components can be formed separately (e.g., molded or the like), or can be formed integrally with the housing using a methods such as, e.g., a spin forming, and the like.

The exhaust treatment device 100 can be manufactured by one or more techniques, and, likewise, the subassembly 4 can be disposed within the shell 5 using one or more methods. For example, the subassembly 4 can be inserted into a variety of shells 5 using a stuffing cone. The stuffing cone is a device that compresses the retention material concentrically about the treatment element 2. The stuffing cone then stuffs the compressed subassembly 4 into the shell 5, such that an annular gap preferably forms between the treatment element and the interior surface of the shell 5 as the retention material becomes compressed about the treatment element. Alternatively, if the retention material is in the form of particles (e.g., pellets, spheres, irregular objects, or the like) the treatment element 2 can be stuffed into the shell and the retention material can be disposed in the shell 5 between the treatment element 2 and the shell 5.

In an alternative method, for example, the shell 5 can comprise two half shell components, also known as clamshells. The two half shell components are compressed together about the subassembly 4, such that an annular gap preferably forms between the treatment element and the interior surface of each half shell as the retention material becomes compressed about the treatment element 2.

In yet another method for forming the exhaust treatment device 100, the shell 5 can have a non-circular cross-sectional geometry (e.g., oval, oblong, and the like). Such non-circular shell designs are preferably manufactured by employing a half shell, preferably a die formed clamshell, which, when combined with another half, can form the desired non-circular geometry. The retention material 3/treatment element 2 subassembly 4 can be placed within one of the half shells. The other half shell can then be attached to that half shell, such that an annular gap preferably forms between the treatment element and the interior surface of each half shell (i.e., the area comprising the retention material). The half shells can be welded together, preferably using a roller seam welding operation.

The "tourniquet" method of forming the exhaust emission control device comprises wrapping the shell 5 (e.g., in the form of a sheet) around the subassembly 4. The adjoining edges of the shell are welded together while the assembly is squeezed at rated pressures calculated to optimize the retention material density. The end-cones/end-plates or the like, are then welded to the shell to form the exhaust treatment device 100. Although this method also has the disadvantages of increased cost due to the number of components that have to be processed and the added cost of welding wires and gases, it claims improved retention material density control.

In all of the above methods, the ends of the shell 5 can be sized, e.g., using a spinform method, to form a conical shaped inlet and/or a conical shaped outlet, thus eliminating the need for separate endcone assemblies in at least one embodiment of the exhaust emission control device. In the alternative, one or both ends of the shell can also be sized so that an end cone, an end plate, an exhaust gas manifold assembly, or other exhaust system component, and combinations comprising at least one of the foregoing components, can be attached to provide a gas tight seal.

Referring now to FIG. 2, an exhaust emission control system, designated 20 is shown. The system 20 comprises a fuel source 22 in fluid communication with an inlet 24 of a reformer 26. An outlet 28 of the reformer 26 is fluidly connected to a reformer conduit 30. The general flow of reformate from the reformer 26 is indicated by an arrow labeled reformate flow direction. Valves 32, 34 are disposed in the reformer conduit 30 to selectively provide fluid communication from the reformer 26 to the exhaust conduit 38. Disposed in serial fluid communication within the exhaust conduit 38 are a particulate trap 40, $NO_x$ adsorber 42, and an oxidation catalyst 44. Valve 32 provides controlled fluid communication from the reformer 26 to the particulate trap 40. Valve 34 provides controlled fluid communication from the reformer 26 to the $NO_x$ adsorber 42. The directional flow of exhaust fluid from an engine (as shown by an arrow labeled exhaust flow direction) is through the particulate trap 40, then the $NO_x$ adsorber 42, and then the oxidation catalyst 44. The fluid passing through the exhaust conduit 38 can then be discharged into the external environment.

Fuel source 22 preferably includes hydrocarbon fuels, including, but not limited to, liquid fuels, such as gasoline, diesel, ethanol, methanol, kerosene, and others; gaseous fuels, such as natural gas, propane, butane, and others; and alternative fuels, such as hydrogen, biofuels, dimethyl ether, and others; and combinations comprising one or more of the foregoing fuels. The selection of fuel source 22 is based upon application, expense, availability, and environmental issues relating to fuel source 22.

In the operation of system 200, the reformer 26 converts the fuel from the fuel source 22 to produce a reformate including, among other products, hydrogen and carbon monoxide gases. The reformate, as it exits the reformer 26, is preferably at a temperature of about 1,000° C. or less. Depending on the particular system architecture, the system may include an optional heat exchanger 29 to reduce the reformate temperature. The heated reformate can then be used to regenerate, de-sulfate, and de-phosphate, particulate trap 40 and $NO_x$ adsorber 42. For example, in system 200, when valve 32 is open (valve 34 closed), hydrogen and carbon monoxide from the reformer 26 can be fed directly to the exhaust fluid stream entering the particulate trap 40. The heated reformate allows the particulate trap to be regenerated using the hydrogen and carbon monoxide. Preferably, the reformate is at a temperature of greater than or equal to 400° C. as it enters the particulate trap 40, with a temperature of about 500° C. to about 700° C. more preferred, and a temperature of about 585° C. to about 625° C. even more preferred.

Valve 32 can be programmed to provide intermittent flow, i.e., a pulse, of hydrogen and carbon monoxide, into particulate trap 40. Valve 32 allows hydrogen and carbon monoxide to flow to particulate trap 40 as needed for regeneration, which can also reduce the amount of fuel consumed during regeneration, when compared to other regeneration processes that use direct injection of fuel as the reducing agent.

Additionally, the hydrogen and carbon monoxide can be used for denitrification and desulfurization purposes. For example, in system 200 when valve 34 is opened, hydrogen and carbon monoxide from reformer 26 is fed to $NO_x$ adsorber 42. Reaction of the hydrogen and carbon monoxide with the $NO_x$ adsorber creates an exotherm, which heats the $NO_x$ adsorber 42 and converts the stored nitrogen oxides and sulfur oxides into reduced species such as ammonia and hydrogen sulfide. The exotherm is preferably sufficient to heat the exhaust fluid to a temperature effective to fully convert the nitrogen oxides and sulfur oxides from $NO_x$ adsorber 42 into nitrogen, ammonia, and hydrogen sulfide. Preferably, the exhaust fluid as it enters the $NO_x$ adsorber 42 is at a temperature of about 160° C. to about 600° C., and with about 260° C. to about 460° C. more preferred.

Reformer 26 and valve 32 can be programmed to provide intermittent or periodic flow of thermal energy, high temperature hydrogen and carbon monoxide. For example, there can be a trapping phase (e.g., of about 300 seconds) with valve 32 closed, and a release phase (e.g., of about 30 seconds), where the reformer 26 is active and valve 32 is open.

The operation of the disclosed $NO_x$ adsorber comprising a substrate with an underlayer of acid adsorber and an overlayer of base adsorber is described in detail below. In use, the exhaust gas passes first through the base adsorber overlayer and to the acid adsorber underlayer. $NO_x$ and $SO_x$ pass through base adsorber overlayer without being adsorbed. The $NO_x$ and $SO_x$ species then reach the acid adsorber underlayer and are trapped on the acid adsorber. After some time, the reformer is turned on, and a hydrogen pulse is sent through the exhaust stream. The hydrogen passes through the base adsorber overlayer without being adsorbed. The hydrogen reaches the acid adsorber underlayer and reacts with the stored (i.e., trapped) $NO_x$ and $SO_x$, producing the $NH_x$ and $SH_x$ chemically reduced species. $NH_4^+$ is the dominant $NH_x$ species formed. The $NH_x$ and $SH_x$ species are strong bases and have little or no affinity for the acid adsorber on which they are produced. The $NH_x$ and $SH_x$ species travel upwards towards the exhaust (i.e., away from the substrate), are trapped on the base adsorber overlayer for the duration of the hydrogen pulse. When the hydrogen pulse ends and the exhaust steam returns to oxidizing conditions, the $NO_x$ and $SO_x$ in the exhaust stream reach the base adsorber overlayer where they react with the stored $NH_x$ and $SH_x$ to form diatomic nitrogen ($N_2$), water, thermal energy, and $SO_2$. The $N_2$ and $SO_2$ are then released to the exhaust stream.

Downstream of the $NO_x$ adsorber is optionally an oxidation catalyst where residual exhaust species, such as carbon monoxide, ammonia and hydrogen sulfide, are oxidized to carbon dioxide ($CO_2$), nitrogen dioxide ($NO_2$), and sulfur dioxide ($SO_2$). Carbon dioxide and sulfur dioxide are acceptable to release to the atmosphere. The oxidation catalyst can thus oxidize the ammonia that is released from and not reacted in the $NO_x$ adsorber.

The disclosed $NO_x$ adsorber is one that can advantageously perform in a reducing environment. Such an environment can be formed, for example, when a hydrogen pulse from a reformer is sent into the exhaust stream that contacts the $NO_x$ adsorber. The disclosed $NO_x$ adsorber treatment element combines an underlayer of an acid adsorber on a substrate with an overlayer of a base adsorber. The two-layer $NO_x$ adsorber allows for reduction of $NO_x$ and $SO_x$ to $NH_x$ and $SH_x$, followed by reaction of the $NH_x$ and $SH_x$ to form $N_2$ and $SO_2$, (i.e., acceptable emissions). Further, the coupling of the $NO_x$ adsorber with a downstream oxidation catalyst allows for the conversion of unacceptable emissions that pass through the $NO_x$ adsorber to emissions acceptable for release into the atmosphere. Yet another advantage may be reducing platinum and rhodium loading of the oxidation catalysts and $NO_x$ adsorbers, which may lead to substantial cost savings.

Figure 3:
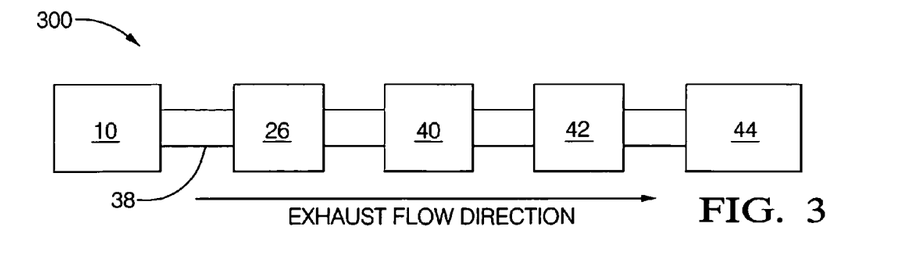
FIG. 3 is a schematic of an exemplary embodiment of an exhaust emission control system.

Referring now to FIG. 3, an exhaust emission control system, designated 300 is shown. The system 300 comprises a post-injected fuel source through an engine 10 in fluid communication with the exhaust conduit 38. An inlet and outlet of the reformer 26 is fluidly connected to the exhaust conduit 38. The general flow of reformate from the reformer 26 is indicated by an arrow labeled exhaust flow direction. Disposed in serial fluid communication within the exhaust conduit 38 are a particulate trap 40, $NO_x$ adsorber 42, and an oxidation catalyst 44. The directional flow of exhaust fluid from an engine (as shown by an arrow labeled exhaust flow direction) is through the particulate trap 40, then the $NO_x$ adsorber 42, and then the oxidation catalyst 44. The fluid passing through the exhaust conduit 38 is then discharged into the external environment.

Also disclosed herein is an exhaust emission control system comprising an exhaust conduit in fluid communication with an exhaust fluid from an engine, wherein the exhaust conduit comprises a close coupled reforming catalyst and a $NO_x$ adsorber underfloor catalyst; a fuel source in fluid communication the exhaust with a reformer wherein the reformer generates hydrogen and carbon monoxide containing fluid from a fuel supplied by the fuel source; a reformer conduit in fluid communication with the exhaust conduit and the reformer; and a valve (or the like) disposed in the reformer conduit for selectively controlling and directing the hydrogen and carbon monoxide containing fluid from the reformer to the $NO_x$ adsorber; wherein the $NO_x$ adsorber comprises a substrate comprising an acid adsorber underlayer and a base adsorber overlayer disposed thereon.

Further disclosed is a method of making a $NO_x$ adsorber, comprising a acid adsorbing washcoat made by mixing an alkali-zirconium based support with precious metals, calcining the precious metals upon the alkali-zirconium based support, mixing additional washcoat components with the precious metals-alkali-zirconium support, applying the acid adsorber washcoat to a ceramic substrate, calcining the substrate. Further disclosed is a second $NO_x$ adsorber layer comprising a base adsorbing washcoat made by mixing a promoter-zirconium based support with precious metals, calcining the precious metals upon the promoter-zirconium based support, mixing additional washcoat components with the precious metals-promoter-zirconium support, applying the base adsorber washcoat over the calcined acid adsorber and calcining the substrate.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A treatment device, comprising:
 a treatment element for treating exhaust gas comprising a substrate and a catalyst, wherein the catalyst comprises:
 (a) an NOx adsorber disposed on the substrate, wherein the NOx adsorber has a zirconium component in solid solution or as a complex oxide with at least one of an alkali element component and an alkaline earth metal component; and
 a precious metal component, and is capable of adsorbing NOx and converting NOx to NHx when contacted with $H_2$, and
 (b) an $NH_3$ adsorber is an overlayer disposed over the NOx adsorber and is a base adsorber which comprises a zirconium component in solid solution with a transition metal oxide component selected from the group consisting of vanadium oxide, niobium oxide, molybdenum oxide, tungsten oxide, rhenium oxide, nickel oxide, and mixtures thereof and, a precious metal component
wherein the $NH_3$ adsorber is capable of adsorbing $NH_3$ and converting $NH_3$ to $N_2$; and
a housing disposed around the substrate.

2. The treatment device of claim 1, wherein the precious metal component comprises about 90 mol. % to about 99 mo. % platinum and about 1 mol. % to about 10 mol. % rhodium, based on the total moles of the precious metal component.

3. The treatment device of claim 1, wherein the alkali element component and an alkaline earth metal component are each independently selected from the group consisting of barium, strontium, calcium, magnesium, cesium, rubidium, potassium, sodium, lithium, and mixtures thereof.

4. The treatment device of claim 1, wherein the precious metal component comprises about 10 mol. % to about 40 mol. % of platinum and about 60 mol. % to about 90 mol. % of ruthenium, based on the total moles of the precious metal component.

5. A treatment element for treating exhaust gas comprising a substrate and a catalyst, wherein the catalyst comprises:

(a) an NOx adsorber disposed on the substrate, wherein the NOx adsorber has a zirconium component in solid solution or as a complex oxide with at least one of an alkali element component and an alkaline earth metal component; and
a precious metal component;
said NOx adsorber being capable of adsorbing NOx and converting NOx to NHx when contacted with $H_2$, and (b) an $NH_3$ adsorber is an overlayer disposed over the NOx adsorber, and is a base adsorber which comprises a zirconium component in solid solution with a transition metal oxide component selected from the group consisting of vanadium oxide, niobium oxide, molybdenum oxide, tungsten oxide, rhenium oxide, nickel oxide, and mixtures thereof and, a precious metal component
wherein the $NH_3$ adsorber is capable of adsorbing $NH_3$ and converting $NH_3$ to $N_2$.

* * * * *